(12) United States Patent
Fleischman et al.

(10) Patent No.: US 8,279,075 B2
(45) Date of Patent: Oct. 2, 2012

(54) CARD SLOT ANTI-TAMPER PROTECTION SYSTEM

(75) Inventors: Scott G. Fleischman, Palmetto, FL (US); James L. Tucker, Clearwater, FL (US); William J. Dalzell, Parrish, FL (US)

(73) Assignee: Honeywell International Inc., Morristown, NJ (US)

( * ) Notice: Subject to any disclaimer, the term of this patent is extended or adjusted under 35 U.S.C. 154(b) by 1118 days.

(21) Appl. No.: 11/565,361

(22) Filed: Nov. 30, 2006

(65) Prior Publication Data

US 2008/0134349 A1 Jun. 5, 2008

(51) Int. Cl.
*G08B 21/00* (2006.01)

(52) U.S. Cl. .......... 340/652; 340/657; 713/194; 726/34; 361/727; 361/752; 361/788

(58) Field of Classification Search .......... 340/540–690; 713/194; 726/34; 361/752, 753, 756, 727, 361/759, 730, 788, 796, 800
See application file for complete search history.

(56) References Cited

U.S. PATENT DOCUMENTS

| | | | |
|---|---|---|---|
| 2,912,600 A | 11/1959 | Isenberg | |
| 3,160,871 A | 12/1964 | Rubinstein | |
| 3,610,808 A | 10/1971 | Horwinski | |
| 3,633,194 A | 1/1972 | Kothe | |
| 3,789,130 A | 1/1974 | Parker | |
| 4,002,397 A | 1/1977 | Wang et al. | |
| 4,161,348 A | 7/1979 | Ulrich | |
| 4,226,491 A * | 10/1980 | Kazama et al. | 439/76.1 |
| 4,390,868 A | 6/1983 | Garwin | |
| 4,447,123 A | 5/1984 | Page et al. | |
| 4,523,186 A | 6/1985 | Fiarman | |
| 4,848,566 A * | 7/1989 | Havens et al. | 206/719 |
| 5,026,141 A | 6/1991 | Griffiths | |
| 5,117,457 A | 5/1992 | Comerford et al. | |
| 5,206,812 A | 4/1993 | Abumehdi | |
| 5,379,184 A * | 1/1995 | Barraza et al. | 361/679.33 |
| 5,398,161 A * | 3/1995 | Roy | 361/727 |
| 5,418,521 A | 5/1995 | Read | |
| 5,468,990 A | 11/1995 | Daum | |
| 5,506,566 A | 4/1996 | Oldfield et al. | |
| 5,541,803 A | 7/1996 | Pope, Jr. et al. | |

(Continued)

FOREIGN PATENT DOCUMENTS

DE 10065747 12/2000

(Continued)

OTHER PUBLICATIONS

IEEE, The Authoritative Dictionary of IEEE Standards Terms, Seventh Edition.*

*Primary Examiner* — Albert Wong
*Assistant Examiner* — Ryan Sherwin
(74) *Attorney, Agent, or Firm* — Shumaker & Sieffert, P.A.

(57) ABSTRACT

A secure insert comprises a shell including a lid and a container configured to receive and encase one or more circuit cards, wherein the shell is further configured to be inserted into and engage a card slot area of a chassis. A bridge connector is disposed inside the shell and configured to couple the one or more circuit cards to a chassis connector. A tamper sensor is disposed inside the shell and configured to detect unauthorized tamper events.

20 Claims, 3 Drawing Sheets

U.S. PATENT DOCUMENTS

| | | | |
|---|---|---|---|
| 5,568,124 A | | 10/1996 | Joyce et al. |
| 5,675,319 A | | 10/1997 | Rivenberg et al. |
| 5,677,769 A | | 10/1997 | Bendett |
| 5,708,552 A | * | 1/1998 | Han et al. .................. 361/799 |
| 5,721,669 A | * | 2/1998 | Becker et al. ............ 361/679.31 |
| 5,754,406 A | * | 5/1998 | Hardt et al. ................. 361/756 |
| 5,821,582 A | | 10/1998 | Daum |
| 5,822,184 A | * | 10/1998 | Rabinovitz ............. 361/679.31 |
| 5,856,910 A | * | 1/1999 | Yurchenco et al. ........... 361/704 |
| 5,923,026 A | * | 7/1999 | Onoda ......................... 235/492 |
| 6,061,250 A | * | 5/2000 | Lavan .......................... 361/797 |
| 6,078,504 A | * | 6/2000 | Miles .......................... 361/727 |
| 6,128,196 A | * | 10/2000 | Hoyle et al. ................. 361/752 |
| 6,215,397 B1 | | 4/2001 | Lindskog |
| 6,232,557 B1 | | 5/2001 | Lounsbury et al. |
| 6,388,873 B1 | * | 5/2002 | Brooks et al. ............ 361/679.34 |
| 6,396,400 B1 | | 5/2002 | Epstein, III et al. |
| 6,400,268 B1 | | 6/2002 | Lindskog |
| 6,527,188 B1 | * | 3/2003 | Shobara et al. .............. 235/486 |
| 6,654,253 B1 | * | 11/2003 | DiMarco ...................... 361/730 |
| 6,664,520 B2 | * | 12/2003 | Clothier ....................... 219/634 |
| 6,692,031 B2 | | 2/2004 | McGrew |
| 6,722,711 B2 | | 4/2004 | Kitzis |
| 6,838,619 B1 | | 1/2005 | Soyfertis |
| 6,853,093 B2 | | 2/2005 | Cohen et al. |
| 6,970,360 B2 | | 11/2005 | Sinha |
| 7,005,733 B2 | | 2/2006 | Kommerling et al. |
| 7,015,823 B1 | | 3/2006 | Gillen et al. |
| 7,021,146 B2 | | 4/2006 | Nash et al. |
| 7,030,974 B2 | | 4/2006 | Spirin et al. |
| 7,045,730 B2 | | 5/2006 | Hollar et al. |
| 7,054,162 B2 | * | 5/2006 | Benson et al. ................ 361/760 |
| 7,113,103 B2 | | 9/2006 | Festa et al. |
| 7,256,692 B2 | | 8/2007 | Vatsaas et al. |
| 7,429,915 B2 | | 9/2008 | Cruzado et al. |
| 2001/0033012 A1 | | 10/2001 | Kommerling et al. |
| 2001/0056542 A1 | | 12/2001 | Cesana et al. |
| 2002/0191788 A1 | | 12/2002 | Inchalik et al. |
| 2002/0199111 A1 | | 12/2002 | Clark et al. |
| 2003/0014643 A1 | | 1/2003 | Asami et al. |
| 2007/0120669 A1 | | 5/2007 | Belden, Jr. |
| 2008/0042809 A1 | * | 2/2008 | Watts et al. .............. 340/426.16 |

FOREIGN PATENT DOCUMENTS

| | | |
|---|---|---|
| EP | 0142013 | 5/1985 |
| EP | 0509567 | 10/1992 |
| EP | 0972632 | 1/2000 |
| EP | 1045352 | 10/2000 |
| EP | 1273997 | 1/2003 |
| WO | 9502742 | 1/1995 |
| WO | 9738364 | 10/1997 |
| WO | 0123980 | 4/2001 |

* cited by examiner

CARD SLOT ANTI-TAMPER PROTECTION SYSTEM

CROSS-REFERENCE TO RELATED APPLICATIONS

This application is related to U.S. Pat. No. 7,796,036, issued on Sep. 14, 2010, and entitled "SECURE CONNECTOR WITH INTEGRATED TAMPER SENSORS". U.S. Pat. No. 7,796,036 is hereby incorporated herein by reference, and referred to herein as the "'12757 Application".

This application is related to co-pending U.S. patent application Ser. No. 11/565,376, filed on Nov. 30, 2006 and published on Jun. 5, 2008 as United States Patent Application Publication No. 2008/0129501, entitled "SECURE CHASSIS WITH INTEGRATED TAMPER DETECTION SENSOR". U.S. patent application Ser. No. 11/565,376 is hereby incorporated herein by reference, and referred to herein as the "'12756 Application".

BACKGROUND

Electronics systems and products containing proprietary information are subject to the risk of unauthorized examination at all levels of assembly including a closed chassis. A broad range of reverse engineering methods can be applied to obtaining unauthorized access to the confidential internal workings, data, etc. inside such a chassis. Such methods include removing access panels, drilling, or other means of gaining access to the proprietary information residing inside the chassis.

Protective methods and apparatus are used to delay the success of such reverse engineering attempts. However, given the necessary resources and time, these methods can be defeated. A known, successful reverse engineering attack renders the protective method or apparatus vulnerable to future attacks, and thereby ends the usefulness. New methods and apparatus are, therefore, needed to detect and/or thwart reverse engineering attacks on systems with proprietary property. Typical military and commercial equipment with confidential internal workings, such as sensitive hardware and/or software components, can be tampered with even when enclosed within a sealed chassis. Reverse engineers use many different techniques for obtaining unauthorized access to the confidential internal workings, data, etc. inside such a chassis. Such techniques include removing access panels, drilling, or other means of gaining access to the enclosed area.

SUMMARY

In one embodiment a secure insert is provided. The secure insert comprises a shell including a lid and a container configured to receive and encase one or more circuit cards, wherein the shell is further configured to be inserted into and engage a card slot area of a chassis. A bridge connector is disposed inside the shell and configured to couple the one or more circuit cards to a chassis connector. A tamper sensor is disposed inside the shell and configured to detect unauthorized tamper events.

DRAWINGS

The present invention can be more easily understood and further advantages and uses thereof more readily apparent, when considered in view of the description of the following figures in which.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that mechanical and electrical changes may be made without departing from the scope of the present invention. The following detailed description is, therefore, not to be taken in a limiting sense.

Embodiments of the present invention enable selective protection of one or more circuit cards in a chassis. This selective protection is enabled by a secure insert which is configured to fit inside the card slot area of a chassis. The secure insert detects attempts to gain access to the circuit cards enclosed within the insert. The secure insert enables protection of sensitive cards without requiring the entire system or chassis to be replaced with a secure chassis. In addition, the secure insert provides potential cost and heat transfer benefits over full box protection systems.

Figure 1:
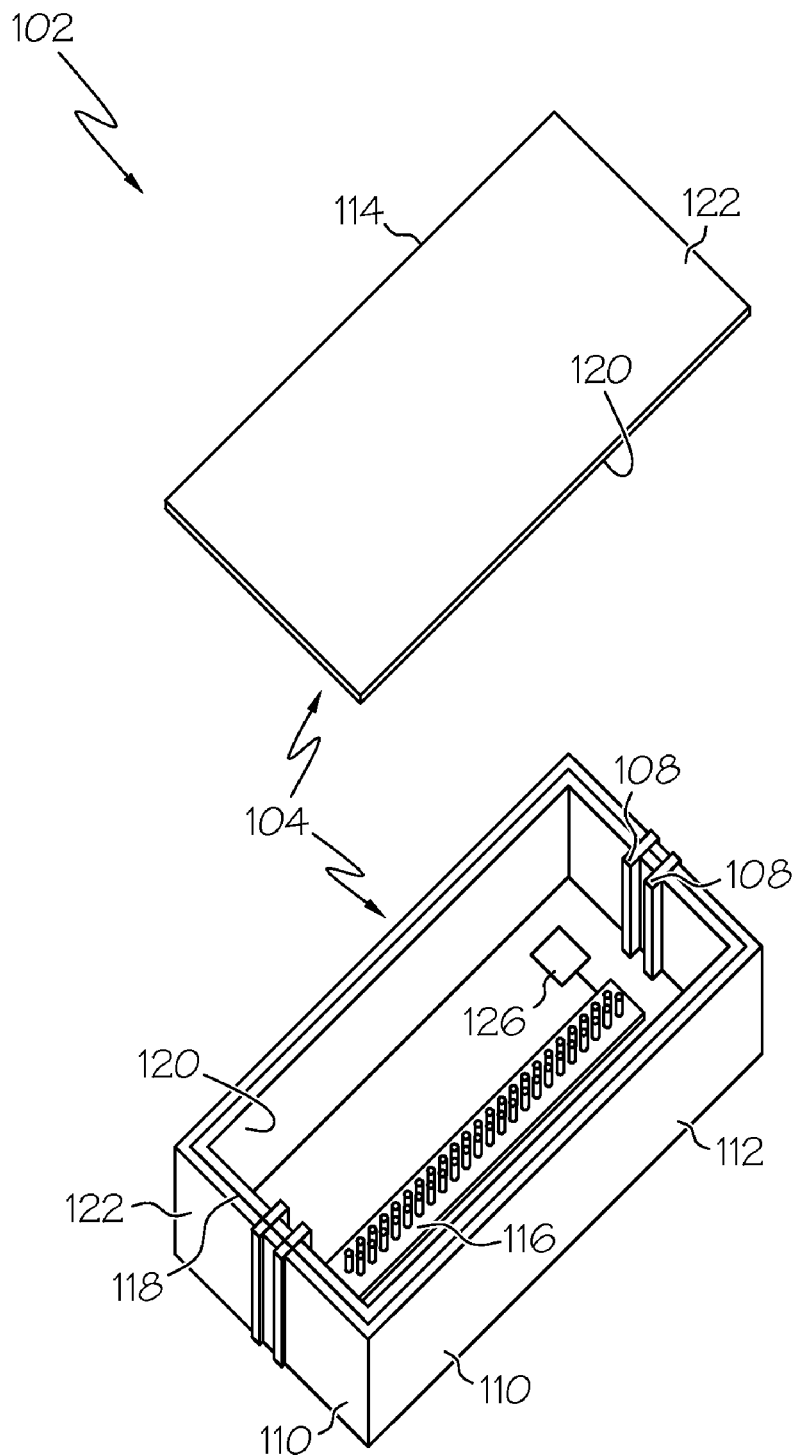
FIG. 1 is an exploded perspective view of a secure insert according to one embodiment of the present invention.

FIG. 1 is an exploded view of a secure insert 102 according to one embodiment of the present invention. Insert 102 includes a shell 104. Shell 104 includes a container 112 and a lid 114 configured to receive and encase a circuit card. In particular, shell 104 includes card slot posts 108 and walls 110 in this example. In other embodiments, the walls of shell 104 can be configured to match the shape of card slot posts in a chassis (e.g. FIG. 2 below). Notably, although shell 104 is shown as only having card slot posts 108 to receive one card, in this example, it is to be understood that shell 104 can receive and encase more than one card in other embodiments. Once a circuit card is inserted into container 112, lid 114 is coupled to container 112 to seal shell 104 and encase the circuit card.

Shell 104 is made of a sufficiently rigid material to hold card 106 in place. For example, suitable materials include, but are not limited to, composite materials (such as fiber reinforced polymers, metal alloys, etc.), metals (such as iron, lead, etc.), and ceramic materials (such as boron carbide, alumina, ceramic metal composites (cermets), etc.). Criteria upon which the material can be selected includes, but is not limited to, stress resistance of the material, resistance to thermal shock, ability of the material to prevent x-radiation or infrared detection, cost of the material, durability of the material, and ease of manufacture of the material, etc.

Insert 102 also includes a bridge connector 116, which is disposed inside shell 104 as shown in FIG. 1. Bridge connector 116 provides a bridge which couples a circuit card to a connector in the card slot area of a chassis. Therefore, a card disposed inside shell 104 continues to function and interact with other cards and devices in the chassis via connector 116 as if insert 102 were not used. It is to be understood, that any suitable bridge connector which maps a connector of a circuit card inside shell 104 to a connector of the chassis can be used.

Insert 102 further comprises a tamper sensor 118. Tamper sensor 118 is configured to detect unauthorized attempts to gain access to the interior of shell 104, also referred to herein as tamper events. For example, tamper events can include, but are not limited to, attempts to remove lid 114 of shell 104, to drill a hole through shell 104, etc. In some embodiments, tamper sensor 118 is a fiber optic matrix which is configured to detect interference with the light traveling through the fiber optic matrix. In such embodiments, drilling through the fiber optic matrix, for example, will disrupt the light in the fiber optic matrix. The disruption will trigger a detected tamper event. In other embodiments, tamper sensor 118 is an electrical sensor configured to detect changes in electrical properties, e.g. resistance, due to unauthorized tamper events such as excessive pressure on or puncturing of tamper sensor 118. It is to be understood that tamper sensor 118 can be implemented as any appropriate type of sensor configured to detect unauthorized tamper events.

Tamper sensor 118 is disposed inside of shell 104. In particular, tamper sensor 118 lines an interior perimeter of shell 104 such that tamper sensor 118 is able to detect unauthorized tamper events. In this example, tamper sensor 118 is located inside lid 114 and walls 110 of container 112. That is tamper sensor 118 is disposed between an inner portion 120 and outer portion 122 throughout walls 110 and lid 114 as shown in FIG. 1. However, it is to be understood that embodiments of the present invention are not so limited. For example, in other embodiments, tamper sensor 118 can line a surface of the inner portion 120 of walls 110 and lid 114 rather than being disposed between inner portion 120 and outer portion 122.

In addition, in this example, insert 102 includes a monitoring circuit 126. Monitoring circuit 126 is coupled to tamper sensor 118 and bridge connector 116. Monitoring circuit 126 monitors tamper sensor 118 for detected tamper events. If a tamper event is detected, monitoring circuit 126 initiates and controls a response to protect sensitive data and components on a circuit card encased in shell 104. In other embodiments, monitoring circuit 126 is located on an encased card and coupled to tamper sensor 118 via connector 116.

Figure 2:
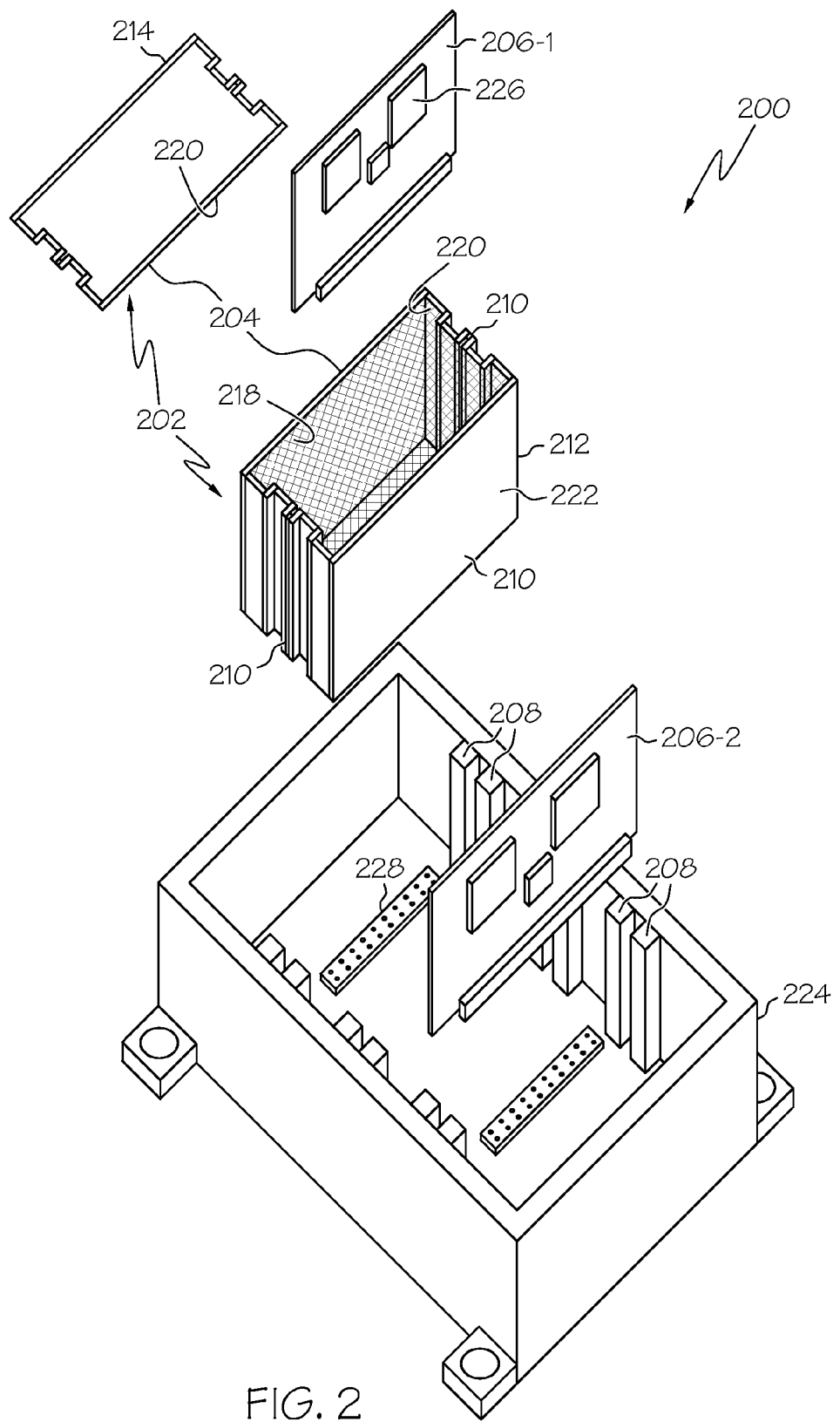
FIG. 2 is an exploded perspective view of an electronic system having a secure insert according to one embodiment of the present invention.

FIG. 2 is an exploded view of an electronic system 200 having a secure insert 202 according to one embodiment of the present invention. System 200 includes a plurality of circuit cards 206-1 and 206-2, a chassis 224, and secure insert 202 having a shell 204. Notably, although only two circuit cards are shown in FIG. 2, embodiments of the present invention are not so limited. Insert 202 is configured to be inserted into and engage the card slot area of chassis 224. In particular, in this example, the shape of walls 210 of insert 202 conform to card slot posts 208 (also referred to as mounting brackets) in chassis 224. One way of manufacturing shell 204 to conform to the shape of card slot posts 208 is to make a mold of the card slot area and manufacture shell 204 based on the mold. Shell 204 is formed to have walls 210 of a container 212. A lid 214 of shell 204 is configured to be coupled to walls 210 and seal container 212.

In addition, insert 202 couples to a connector 228 in chassis 224 via a connector inside shell 204 of insert 202 (e.g. bridge connector 116 shown in FIG. 1). In this way, card 206-1, which is inserted into shell 204 to protect sensitive data or components on circuit card 206-1, is able to function and communicate with other components in chassis 224 as if insert 202 were not used.

Insert 202 also includes a tamper sensor 218 disposed inside of shell 204. In this example, tamper sensor 218 lines a surface of an inner portion 220 of lid 214 and walls 210. However, it is to be understood that in other embodiments, tamper sensor 218 can be located differently. For example, tamper sensor 218 can be disposed between inner portion 220 and outer portion 222 of walls 210 and lid 214 as discussed above with respect to FIG. 1. Tamper sensor 218 is configured to detect unauthorized tamper events, such as drilling through shell 204 or attempts to remove lid 214.

Tamper sensor 218 can be implemented as any appropriate type of sensor configured to detect unauthorized tamper events. For example, in one embodiment, tamper sensor 218 is a fiber optic matrix which is configured to detect interference with the light traveling through the fiber optic matrix. In such an embodiment, drilling through the fiber optic matrix, for example, will disrupt the light in the fiber optic matrix. The disruption will trigger a detected tamper event. In other embodiments, tamper sensor 218 is an electrical sensor configured to detect changes in electrical properties, e.g. resistance, due to unauthorized tamper events such as excessive pressure on or puncturing of tamper sensor 218.

In operation, container 212 of shell 204 is inserted into the card slot area of chassis 224. Circuit card 206-1 is then placed inside container 212 and coupled to a connector inside container 212 (e.g. bridge connector 116 in FIG. 1). The connector inside container 212 couples card 206-1 to connector 228 in chassis 224. Lid 214 is then coupled to container 212 to seal shell 204. Circuit cards which do not contain sensitive data, such as circuit card 206-2, can be installed in chassis 224 in the normal fashion using card slot posts 208. If someone, such as a reverse engineer, attempts to gain access to the interior of shell 204, tamper sensor 218 detects the unauthorized tamper event.

A monitoring circuit 226 monitors tamper sensor 218 for detected tamper events. In this embodiment, monitoring circuit 226 is located on circuit card 206-1 and coupled to tamper sensor 218 via the connector in shell 204. However, embodiments of the present invention are not so limited. For example, in other embodiments, monitoring circuit 226 is coupled to inner portion 220 of one of walls 210 and connected to components on circuit card 206-1 via the connector in shell 204. If tamper sensor 218 detects a tamper event, monitoring circuit 226 controls a response to protect the sensitive data and/or components on circuit card 206-1. For example, protective responses include but are not limited to, erasing data on circuit card 206-1, encrypting data on circuit card 206-1, and physically destroying components on circuit card 206-1. The response initiated and controlled by monitoring circuit 226 depends on the application in which insert 202 is used.

Figure 3:
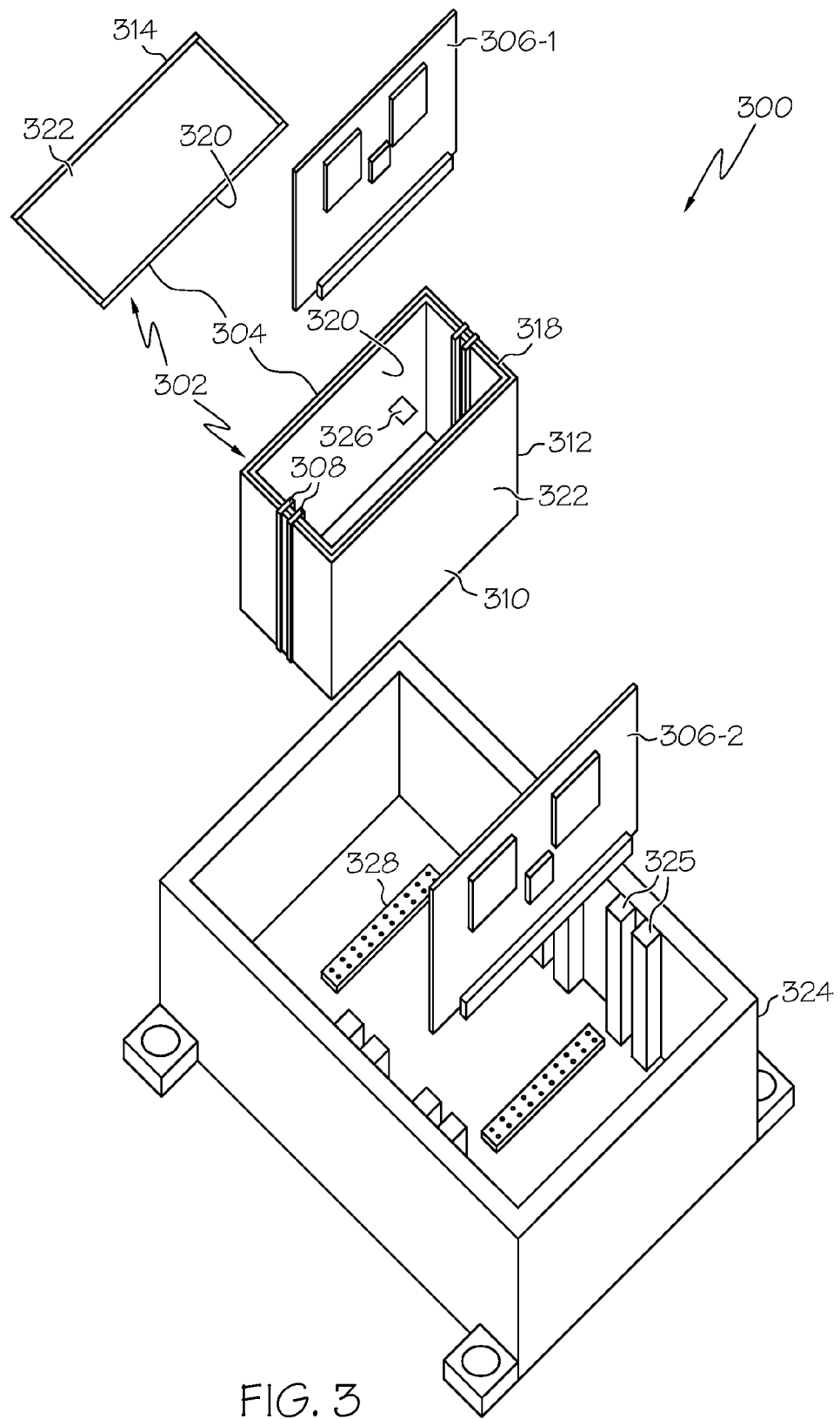
FIG. 3 is an exploded perspective view of another electronic system having a secure insert according to another embodiment of the present invention.

FIG. 3 is an exploded view of an electronic system 300 having a secure insert 302 according to another embodiment of the present invention. System 300 includes a plurality of circuit cards 306-1 and 306-2, a chassis 324, and secure insert 302 having a shell 304. Notably, although only two circuit cards are shown in FIG. 3, embodiments of the present invention are not so limited. Insert 302 is configured to be inserted into and engage the card slot area of chassis 324. In particular, in this example, card slot posts which would be used to hold circuit card 306-1 in place have been removed from chassis 324 such as by machining out the card slot posts. Card slot posts 308, however, are included in shell 304 to hold circuit card 306-1 in place. Shell 304 includes a container 312 and a lid 314.

In addition, insert 302 couples to a connector 328 in chassis 324 via a connector inside shell 304 of insert 302 (e.g. bridge connector 116 shown in FIG. 1). In this way, card 306-1, which is inserted into shell 304 to protect sensitive data or components on circuit card 306-1, is able to function and communicate with other components in chassis 324 as if insert 302 were not used.

Insert 302 also includes a tamper sensor 318 disposed inside of shell 304. In this example, tamper sensor 318 is disposed inside walls 310 of container 312 and inside lid 314. In particular, tamper sensor 318 is located between an inner portion 320 and outer portion 322 of lid 314 and walls 310 as described above with regards to FIG. 1. However, it is to be understood that in other embodiments, tamper sensor 318 can be located differently. For example, tamper sensor 318 can line a surface of inner portion 320 of lid 314 and walls 310 as described above with regards to FIG. 2. Tamper sensor 318 is configured to detect unauthorized tamper events, such as drilling through shell 304 or attempts to remove lid 314.

Tamper sensor 318 can be implemented as any appropriate type of sensor configured to detect unauthorized tamper events. For example, in one embodiment, tamper sensor 318 is a fiber optic matrix which is configured to detect interference with the light traveling through the fiber optic matrix. In such an embodiment, drilling through the fiber optic matrix, for example, will disrupt the light in the fiber optic matrix. The disruption will trigger a detected tamper event. In other embodiments, tamper sensor 318 is an electrical sensor configured to detect changes in electrical properties, e.g. resistance, due to unauthorized tamper events such as excessive pressure on or puncturing of tamper sensor 318.

In operation, container 312 of shell 304 is inserted into the card slot area of chassis 324. Circuit card 306-1 is then placed inside container 312 and coupled to a connector inside container 312 (e.g. bridge connector 116 in FIG. 1). The connector inside container 312 couples card 306-1 to a connector 328 in chassis 324. Lid 314 is then coupled to container 312 to seal shell 304. Circuit cards which do not contain sensitive data, such as circuit card 306-2, can be installed in chassis 324 in the normal fashion using card slot posts 325. If someone, such as a reverse engineer, attempts to gain access to the interior of shell 304, tamper sensor 318 detects the unauthorized tamper event.

A monitoring circuit 326 monitors tamper sensor 318 for detected tamper events. In this embodiment, monitoring circuit 326 is coupled to inner portion 320 of one of walls 310 and connected to components on circuit card 306-1 via the connector in shell 304. However, as discussed above, embodiments of the present invention are not so limited. For example, in other embodiments, monitoring circuit 326 can be located on circuit card 306-1 and coupled to tamper sensor 318 via the connector in shell 304 as discussed above with respect to FIG. 2. If tamper sensor 318 detects a tamper event, monitoring circuit 326 controls a response to protect the sensitive data and/or components on circuit card 306-1. For example, protective responses include but are not limited to, erasing data on circuit card 306-1, encrypting data on circuit card 306-1, and physically destroying components on circuit card 306-1. The response initiated and controlled by monitoring circuit 326 depends on the application in which insert 302 is used.

Hence, embodiments of the present invention enable selective protection of cards inside a chassis. This selective protection is advantageous for a number of reasons. For example, some systems only have sensitive data on a limited number of cards. Therefore, it may be more cost-effective to protect only those limited number of cards with a secure insert rather than full box protection of the entire chassis. Additionally, in systems already in use, it may be impractical to replace the entire system with full box protection. However, embodiments of the present invention enable sensitive components in those systems to be protected by simply installing a secure insert into the card slot area. One other advantage has to do with heat transfer. In many systems, non-sensitive components, such as power sources, generate a relatively large amount of heat compared to sensitive circuit cards. Using a full box protection to protect the entire system can create difficulties in transferring the heat out of the chassis. However, by using a secure insert to protect only the sensitive cards, heat can be more easily transferred while still protecting the sensitive data.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A secure insert comprising:
a shell including a lid and a container that defines a cavity that is configured to receive one or more circuit cards,
wherein the lid is configured to be coupled to the container to enclose one or more circuit cards within the cavity,
wherein the container is configured to be inserted into and engage a card slot area of a chassis, and
wherein the shell is configured such that the lid is removable from the container while the container is engaged with the card slot area of the chassis, and the cavity defined by the container is accessible while the lid is removed from the container and the container is engaged with the card slot area of the chassis;
a bridge connector disposed inside the shell and configured to couple the one or more circuit cards to a chassis connector; and
a tamper sensor disposed inside the shell and configured to detect unauthorized tamper events, wherein the tamper sensor lines at least a portion of the shell.

2. The secure insert of claim 1, wherein the shell comprises one or more of a composite material, a metal, or a ceramic material.

3. The secure insert of claim 1, wherein the tamper sensor comprises a fiber optic matrix or an electrical sensor configured to detect changes in electrical characteristics.

4. The secure insert of claim 1, wherein the tamper sensor lines a surface of an inner portion of the lid and an inner portion of one or more walls of the container.

5. The secure insert of claim 1, wherein the tamper sensor is disposed between an inner portion and an outer portion of the lid and between an inner portion and an outer portion of one or more walls of the container.

6. The secure insert of claim 1, wherein one or more walls of the container are configured to conform to the shape of chassis card slot posts in a card slot area of a chassis.

7. The secure insert of claim 1, wherein the shell includes a plurality of card slot posts disposed in the container to hold the one or more circuit cards in place.

8. The secure insert of claim 1, further comprising a monitoring circuit coupled to the tamper sensor, wherein the monitoring circuit is configured to control a response to a detected tamper event in order to protect sensitive data on the one or more circuit cards.

9. An electronic system comprising:
at least one circuit card;
a chassis configured to house the at least one circuit card, wherein the chassis includes a card slot area comprising at least one chassis connector; and
a secure insert comprising:

a shell including a lid and a container that defines a cavity that is configured to receive the at least one circuit card, wherein the lid is configured to be coupled to the container and enclose the at least one circuit card within the container, wherein the container is configured to be inserted into and engage the card slot area of the chassis, and wherein the shell is configured such that the at least one circuit card is removable from the cavity of the container while the lid is removed from the container and the container is engaged with the card slot area of the chassis;

a bridge connector disposed inside the shell, wherein the at least one circuit card and the at least one chassis connector are configured to be electrically coupled via the bridge connector; and a tamper sensor disposed inside the shell and configured to detect unauthorized tamper events, wherein the tamper sensor lines at least a portion of the shell.

10. The electronic system of claim 9, wherein the tamper sensor comprises a fiber optic matrix or an electrical sensor configured to detect changes in electrical characteristics.

11. The electronic system of claim 9, wherein the tamper sensor lines a surface of an inner portion of the lid and an inner portion of one or more walls of the container.

12. The electronic system of claim 9, wherein the tamper sensor is disposed between an inner portion and an outer portion of the lid and between an inner portion and an outer portion of one or more walls of the container.

13. The electronic system of claim 9, wherein one or more walls of the container are configured to conform to the shape of chassis card slot posts in the card slot area of the chassis.

14. The electronic system of claim 9, wherein the secure chassis insert further comprises a monitoring circuit coupled to the tamper sensor, wherein the monitoring circuit is configured to control a response to a detected tamper event in order to protect sensitive data on the one or more circuit cards.

15. The secure insert of claim 1, wherein the container comprises a plurality of walls and wherein the lid is configured to be coupled to the plurality of walls such that the shell is sealed.

16. The electronic system of claim 9, wherein the lid is configured to be coupled to the container to encase the at least one circuit card in the shell.

17. A method comprising:

inserting a container of a shell into a card slot area of a chassis, wherein the container defines a cavity;

positioning a circuit card within the cavity of the container;

coupling the circuit card to a bridge connector, wherein the bridge connector is disposed inside the container and is configured to couple the circuit card to a chassis connector of the chassis; and after inserting the container into the card slot area of the chassis, coupling a lid of the secure insert to the container, wherein the lid encloses the circuit card within the container, wherein the shell is configured such that the circuit card is removable from the cavity while the lid is removed from the container and the container is engaged with the card slot area of the chassis, and the shell comprises a tamper sensor that is configured to detect unauthorized tamper events, wherein the tamper sensor lines at least a portion of the shell.

18. The method of claim 17, wherein the container comprises a plurality of walls, and wherein coupling the lid to the container comprises coupling the lid to the plurality of walls such that the shell is sealed.

19. The secure insert of claim 8, wherein the monitoring circuit controls a response to a detected tamper event by at least one of erasing data on the one or more circuit cards, encrypting data on the one or more circuit cards, or physically destroying a component of the one or more circuit cards.

20. The electronic system of claim 9, wherein the chassis is configured to receive the at least one circuit card directly within the card slot area.

\* \* \* \* \*